US009146835B2

(12) United States Patent
Bellows et al.

(10) Patent No.: US 9,146,835 B2
(45) Date of Patent: Sep. 29, 2015

(54) METHODS AND SYSTEMS WITH DELAYED EXECUTION OF MULTIPLE PROCESSORS

(75) Inventors: Mark D. Bellows, Rochester, MN (US);
Mark S. Fredrickson, Rochester, MN (US); Scott D. Frei, Rochester, MN (US); Steven P. Jones, Rochester, MN (US); Chad B. McBride, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 915 days.

(21) Appl. No.: 13/343,809

(22) Filed: Jan. 5, 2012

(65) Prior Publication Data

US 2013/0179720 A1    Jul. 11, 2013

(51) Int. Cl.
*G06F 11/36* (2006.01)
*G06F 11/16* (2006.01)

(52) U.S. Cl.
CPC .......... *G06F 11/366* (2013.01); *G06F 11/1695* (2013.01)

(58) Field of Classification Search
CPC ............................ G06F 11/366; G06F 11/1695
USPC ......................................................... 713/401
See application file for complete search history.

(56) References Cited

U.S. PATENT DOCUMENTS

| 5,231,640 | A | 7/1993 | Hanson et al. |
| 5,452,443 | A | 9/1995 | Oyamanda et al. |
| 5,625,836 | A | 4/1997 | Barker et al. |
| 5,708,836 | A | 1/1998 | Wilkinson et al. |
| 5,892,897 | A | 4/1999 | Carlson et al. |
| 6,148,348 | A * | 11/2000 | Garnett et al. .................. 710/14 |
| 6,199,171 | B1 | 3/2001 | Bossen et al. |
| 6,769,073 | B1 | 7/2004 | Shapiro |
| 7,146,520 | B2 | 12/2006 | Billeci et al. |
| 7,502,969 | B2 | 3/2009 | Beard et al. |
| 8,443,230 | B1 * | 5/2013 | Roxby et al. .................... 714/11 |
| 2005/0251802 | A1 * | 11/2005 | Bozek et al. .................... 718/1 |

(Continued)

FOREIGN PATENT DOCUMENTS

EP    2113842 A1    11/2009

OTHER PUBLICATIONS

Fatemi, Processor Architecture Design for Smart Cameras, Eindhoven University, ASCI Graduate School, The Netherlands, 2007, Dissertation Series No. 139, (161 pgs).

(Continued)

*Primary Examiner* — Mohammed Rehman
(74) *Attorney, Agent, or Firm* — Toler Law Group, P.C.

(57) ABSTRACT

A first first-in-first-out (FIFO) memory may receive first processor input from a first processor group that includes a first processor. The first processor group is configured to execute program code based on the first processor input that includes a set of input signals, a clock signal, and corresponding data. The first FIFO may store the first processor input and may output the first processor input to a second FIFO memory and to a second processor according to a first delay. The second FIFO memory may store the first processor input and may output the first processor input to a third processor according to a second delay. The second processor may execute at least a first portion of the program code and the third processor may execute at least a second portion of the program code responsive to the first processor input.

20 Claims, 9 Drawing Sheets

(56) References Cited

U.S. PATENT DOCUMENTS

| | | | |
|---|---|---|---|
| 2006/0150000 A1* | 7/2006 | Mizutani | 714/6 |
| 2006/0190702 A1* | 8/2006 | Harter et al. | 712/15 |
| 2007/0022311 A1* | 1/2007 | Park | 713/310 |
| 2008/0141060 A1* | 6/2008 | Matsumoto | 713/401 |
| 2008/0244305 A1* | 10/2008 | Troppmann et al. | 713/601 |
| 2009/0086650 A1* | 4/2009 | Moore et al. | 370/253 |
| 2009/0177866 A1* | 7/2009 | Choate et al. | 712/200 |
| 2009/0217092 A1 | 8/2009 | Weiberle et al. | |
| 2010/0318991 A1 | 12/2010 | Venkitachalam et al. | |
| 2012/0272007 A1* | 10/2012 | Moyer | 711/128 |

OTHER PUBLICATIONS

Brian T. Gold et al., "Tolerating Processor Failures in a Distributed Shared-Memory Multiprocessor", Computer Architecture Lab at Carnegie Mellon (CALCM) Technical Report 2006-1, pp. 1-10.

* cited by examiner

METHODS AND SYSTEMS WITH DELAYED EXECUTION OF MULTIPLE PROCESSORS

I. FIELD OF THE DISCLOSURE

The present disclosure relates generally to delayed execution of program code on multiple processors.

II. BACKGROUND

Implementing lockstep processing involves arranging two identical processors to execute side-by-side, where one processor executes under the same circumstances as the other processor. An implementation of lockstep processing may involve initializing each processor to the same state during system start-up and providing each processor with the same inputs (code, bus operations, and asynchronous events) so that each processor may execute under the same circumstances during normal execution based on a clock signal. Lockstep processing can be used to detect an error in either of the processors by detecting a difference resulting from a comparison of the states of the processors monitored in a lockstep system. Lockstep processing is used to achieve high reliability in a microprocessor system where one processor can monitor and verify the operation of the other processor.

Some systems employ delayed lockstep processing in which execution of one processor is delayed and a corresponding delay of output of the other processor is implemented before output of both processors is compared. Such a delayed lockstep processor architecture may provide a way to detect non-deterministic types of failures, such as chip operating temperature or voltage drop associated with the common clock or the supply voltage.

III. SUMMARY

In a particular embodiment, a method may include receiving first processor input, at a first first-in-first-out (FIFO) memory, from a first processor group that includes a first processor. The first processor group may be configured to execute program code based on the first processor input that includes a set of input signals, a clock signal, and corresponding data utilized for execution of the program code. The method may include storing the first processor input at the first FIFO memory. The first FIFO memory may be coupled to a second processor. The method may further include outputting the first processor input from the first FIFO memory to a second FIFO memory and to a second processor according to a first delay. The method may include executing, at the second processor, at least a first portion of the program code responsive to the first processor input. The method may also include storing the first processor input at the second FIFO memory. The second FIFO memory may be coupled to a third processor. The method may further include outputting the first processor input from the second FIFO memory to a third processor according to a second delay. At least a second portion of the program code may be executed at the third processor responsive to the first processor input.

In another particular embodiment, a system may include a first FIFO memory that may be configured to receive a first processor input from a first processor group that may include a first processor. The first processor input may include a set of input signals, a clock signal, and corresponding data utilized for execution of program code by the first processor. The first FIFO memory may include logic to store the first processor input and to output the first processor input to a second FIFO memory and to a second processor. The first FIFO memory may output the first processor input to the second processor according to a first delay. The second processor may be coupled to the first FIFO memory and may be configured to execute at least a first portion of the program code in response to the first processor input. The second FIFO memory may include logic to store the first processor input and to output the first processor input to a third processor according to a second delay. A third processor may be coupled to the second FIFO memory. The third processor may be configured to execute at least a second portion of the program code in response to the first processor input.

In yet another particular embodiment, a removable computer card may include an interface that may be couplable to an expansion slot of a computer system board. The removable computer card may also include a first FIFO memory that may be configured to receive first processor input from a first processor group that may include a first processor. The first processor input may include a set of input signals, a clock signal, and corresponding data utilized for execution of program code by the first processor. The first processor group may be located on the computer system board. The first FIFO memory may include logic to store the first processor input and to output the first processor input to a second FIFO memory and to a second processor. The second processor may be coupled to the first FIFO memory. The first FIFO memory may output the first processor input to the second processor according to a first delay. The second processor may be configured to execute at least a first portion of the program code in response to the first processor input. The second FIFO memory may include logic to store the first processor input and to output the first processor input to a third processor according to a second delay. A third processor may be coupled to the second FIFO memory and may be configured to execute at least a second portion of the program code in response to the first processor input.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

IV. BRIEF DESCRIPTION OF THE DRAWINGS

V. DETAILED DESCRIPTION

A computer system including multiple processors may be implemented to execute a computer program on each processor according to a delay, while utilizing a single set of computer system resources. For example, a tester may debug a computer system by executing computer program code on a computer system with multiple processors that are each capable of executing the computer program code according to a delay utilizing a single set of computer system resources available in the computer system.

An implementation of the computer system may include a computer system board that includes a processor group and an input/output connection slot for attachment of a computer card. The processor group may include one processor and one memory that may store the computer program code. When the computer program code is executed, the processor group may receive a set of input including input signals, a clock signal, and corresponding data that the processor group is responsive to for execution of the computer program code. A computer card may be operatively connected to the expansion slot of the computer system board. The set of input may be output to the computer card before, during, or after the processor group executes the computer program code based on the set of input.

The computer card may include two first-in-first out (FIFO) memory-processor pairs, where each FIFO memory-processor pair includes a processor and a FIFO memory. A FIFO memory of a first FIFO memory-processor pair may store the set of input and may output the set of input to a processor of the first FIFO memory-processor pair and a FIFO memory of a second FIFO memory-processor pair according to a first delay. The processor of the first FIFO memory-processor pair may execute the computer program code in response to the set of input. A FIFO memory of a second FIFO memory-processor pair may store the set of input and may output the set of input to a processor of the second FIFO memory-processor pair according to a second delay. The processor of the second FIFO memory-processor pair may execute the computer program code in response to the set of input.

By connecting the computer card to the computer system board, the processor of the first FIFO memory-processor pair and the processor of the second FIFO memory-processor pair on the computer card can execute the computer program code according to the set of input received from the processor group. However, the processor of the first FIFO memory-processor pair and the processor of the second FIFO memory-processor pair may execute the computer program code without accessing the set of resources available on the computer system board. The delay in execution of the computer program code on each of the processors on the computer card may allow one to detect an error in execution of the program code through monitoring the results during execution of the program code.

Figure 1:
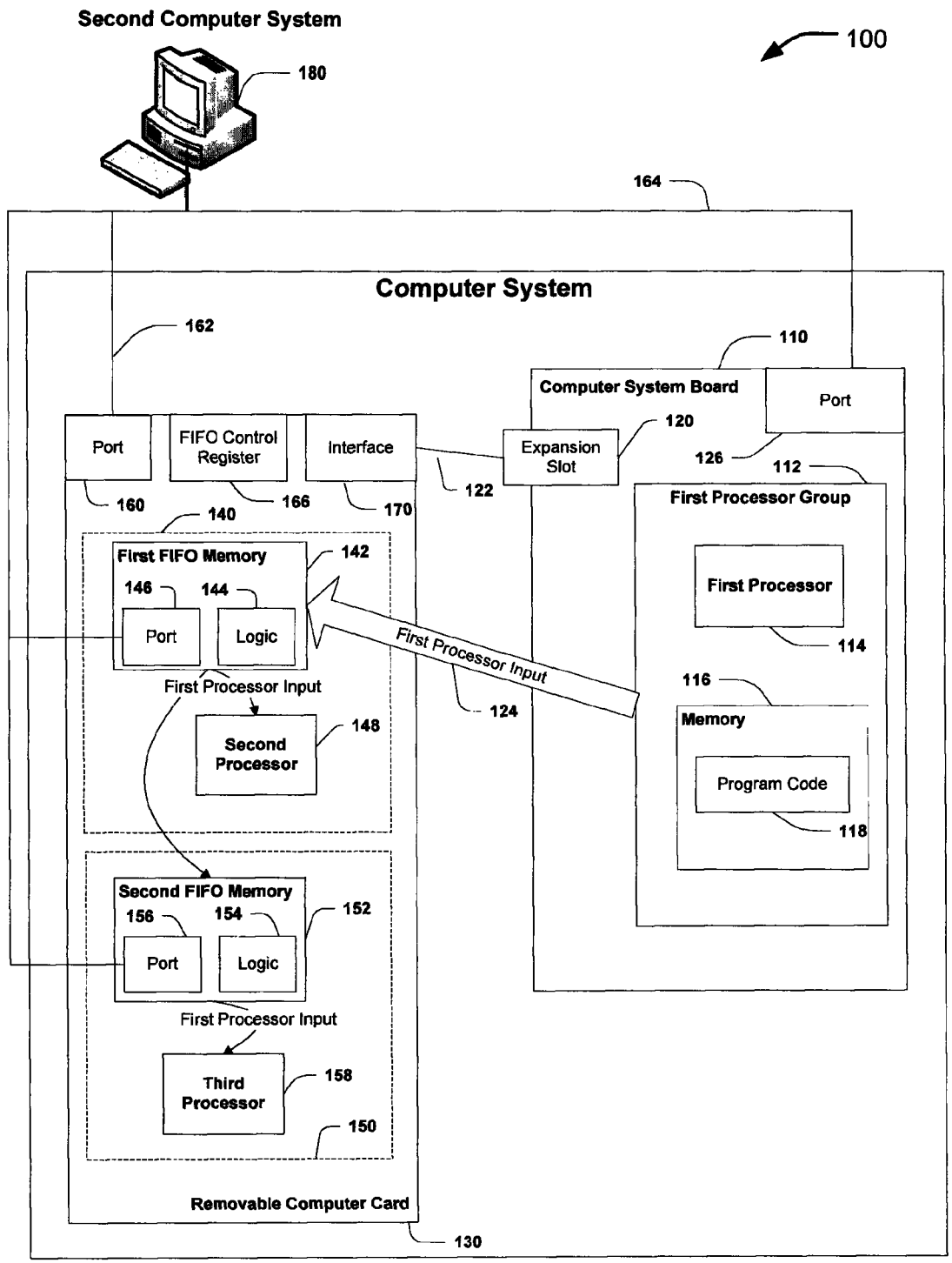
FIG. 1 is a system diagram of a first particular embodiment of a system that executes program code on a second processor and a third processor according to a delay and responsive to input from a first processor group.

Referring to FIG. 1, a system diagram of a first particular embodiment of a computer system that executes program code on a second processor and a third processor according to a delay and in response to input from a first processor group is depicted and generally designated 100. The computer system 100 includes multiple processors executing the program code according to a time delay, using input shared by a first processor.

The computer system 100 may include a computer system board 110 that may include a first processor group 112. The first processor group 112 may include a first processor 114 coupled to a memory 116. While the computer system 100 includes the single computer system board (i.e., the computer system board 110) with the single processor group (i.e., the first processor group 112), the number of computer processor boards and processor groups may be increased and configured based on processing considerations. The first processor group 112 may be configured to execute program code 118 according to a first processor input 124. The first processor input 124 may include a set of input signals, a clock signal, and corresponding data utilized by the first processor group 112 for execution of the program code 118. The first processor 114 may be a multicore processor, a single instruction multiple data processor, a reconfigurable single instruction multiple data, or another type of processor.

The memory 116 may reside within the first processor group 112 and may be configured to store the program code 118. Alternatively the computer system board 110 may have main system memory (not shown) that may be configured to store the program code 118 so that the program code 118 is accessible by the first processor group 112. Alternatively, the memory 116 may be a cache associated with or located on the first processor 114. The program code 118 may be a hardware exerciser program or another set of instructions executable by the first processor 114.

The computer system board 110 may include an expansion slot 120 that supports a connection 122 to a removable computer card 130 (e.g., a lab test computer card). The computer system board 110 may further include additional expansion slots (not shown) depending on the type of computer system board utilized.

The computer system board 110 may include a port 126 that may be configured to enable another computer system to access or configure the computer system board 110. In one embodiment, a second computer system 180 (e.g., a computer lab testing station or a computer test system) may access the computer system board 110 to access system information of the first processor 114, the memory 116, or the computer system board 110 when the second computer system 180 is operatively connected 164 to the computer system board 110 via the port 126. The system information may be used to examine the state of the first processor 114 at or near the time the first processor 114 encounters a failure point during execution of the program code 118. For example, the system information may include a bus trace, a scan dump, and access registers that may provide information related to the state of the first processor 114. Additional system information may be retrieved by performing testing and applying debugging techniques (e.g., using a debugger, tracing, or dumping memory) to the first processor group 112 or the first processor 114. In another embodiment, the second computer system 180 may access the computer system board 110 for disabling/stopping a clock on the first processor 114 when the second computer system 180 is operatively connected 164 to the computer system board 110 via the port 126. In one instance, debugger software may be used to stop execution of the first processor 114, where the debugger software is operably configured to control execution of the program 118 code on the first processor.

The removable computer card 130 may include an interface 170 configured to facilitate communication with the computer system board 110 when the interface 170 is operably coupled to the expansion slot 120 of the computer system board 110. The removable computer card 130 may include a FIFO memory 142 that is configured to receive the first processor input 124 from the first processor group 112 when an interface 170 is operably coupled to the expansion slot 120.

The first FIFO memory 142 may include logic 144 to store the first processor input 124. The removable computer card 130 may include a second processor 148 that executes the program code 118 based on system input provided to the second processor 148. The system input may be the first processor input 124 provided from the first processor group 112. The logic 144 may be adapted to output the first processor input 124 to the second processor 148 according to a first delay. In one embodiment, the first FIFO memory 142 may be a cache of the second processor 148. The first FIFO memory 142 may also output the first processor input 124 to a second FIFO memory 152. The second FIFO memory 152 may be a component of the removable computer card 130, may be a component of the computer system board 110, or may be a component of a second removable computer card (not shown). In another embodiment, the first FIFO memory 142, the second FIFO memory 152, or both, may be designated in a portion of the main system memory (not shown) of the computer system board 110. The first FIFO memory 142, the second FIFO memory 152, or both, may be designated in a portion of embedded random-access memory (RAM) or register array memory of the computer system board 110. In yet another embodiment, the first FIFO memory 142, the second FIFO memory 152, or both, may be designated in a portion of a computer storage medium coupled to the computer system board 110, where the computer storage medium includes one of a computer-readable storage medium, a computer disk drive, a flash memory drive, and an internet storage medium.

The first FIFO memory 142 may include a port 146 that is configured to enable access to contents of the first FIFO memory 142. The port 146 may enable configuration of the first FIFO memory 142. For example, the port 146 may support disabling/enabling the first FIFO memory 142 resulting in the inoperability of the first FIFO memory 142 during execution of the program code 118. When disabled, the first FIFO memory 142 may not output the first processor input 124 to the second FIFO memory 152 and the second processor 148. In such a case, the second processor 148 may not execute the program code 118 without receiving the first processor input 124. Accordingly, the second processor 148 may be disabled upon disabling of the first FIFO memory 142. In another example, the port 146 may allow the first FIFO memory 142 to be configured with a first indicator that is associated with execution of the program code 118. In another example, the port 146 may allow the first FIFO memory 142 to be modified for adjustment of the first delay.

The second processor 148 may be configured to execute at least a first portion of the program code 118 in response to the first processor input 142. The output produced by the second processor 148 during execution of the program code 118 may be ignored since the second processor 148 is emulating the execution of the program code 118. Emulating execution of the program code 118 refers to executing the program code 118 based on the first processor input 124 so as to duplicate the functions performed by the first processor group 112, such that the behavior of the second processor 148 closely resembles the behavior of the first processor group 112. The second processor 148 may result in a change of state of the second processor 148 that resembles a corresponding change of state of the first processor group 112 based on execution of the program code 118. However, the second processor 148 may not result in a change to the resource or data of the computer system 100 since the second processor 148 is emulating execution.

The second FIFO memory 152 may be configured to receive the first processor input 124 from the first FIFO memory 142. The second FIFO memory 152 may include logic 154 to store the first processor input 124. The second FIFO memory 152 also may include logic 154 to output the first processor input 124 to a third processor 158 according to a second delay. In one embodiment, the second FIFO memory 152 may be a cache of the third processor 158.

The second FIFO memory 152 may include a port 156 that is configured to enable access to contents of the second FIFO memory 152. The port 156 may enable configuration of the second FIFO memory 152. For example, the port 156 may support disabling/enabling the second FIFO memory 152 resulting in the inoperability of the second FIFO memory 152 during execution of the program code. When disabled, the second FIFO memory 152 may not output the first processor input 124 to the third processor 158. In such a case, the third processor may not execute the program code 118 without receiving the first processor input 124. Accordingly, the third processor 158 may be disabled upon disabling of the second FIFO memory 152. In another example, the port 156 may allow the second FIFO memory 152 to be configured with a second indicator that is associated with execution of the program code 118. In another example, the port 156 may allow the second FIFO memory 152 to be modified for adjustment of the second delay.

The removable computer card 130 may include the third processor 158 that may execute the program code 118 based on the first processor input 124. The third processor 158 may be configured to execute at least a second portion of the program code 118 in response the first processor input 124. The output produced by the third processor 158 during execution of the program code 118 may be ignored since the third processor 158 is emulating the execution of the program code 118. A state of the third processor 158 may change during execution of the second portion of the program code 118 in a manner that resembles the first processor group 112. However, the third processor 158 may not cause changes related to the resources or data of the computer system 100 since the third processor 158 is emulating execution.

The first delay and the second delay may be variable such that they may be programmed by a user of the system 100 (e.g., before each execution of the program code 118). Programming the first delay, the second delay, or both, may include defining the amount of storage utilized in the FIFO memories 142, 152 corresponding to each delay and may include designating a type of storage or memory structure that serves as the FIFO memories 142, 152. Further, the first delay may not be equal to the second delay. The amount of storage utilized and the type of storage selected may determine the amount of history of information that is stored in the FIFO memories 142, 152 during execution of the program code 118 and may determine the amount of the first delay, the second delay, or both.

The first delay may be a particular amount of time that the first FIFO memory 142 waits before outputting the first processor input 124 to the second processor 148. Similarly, the second delay may be a particular amount of time that the second FIFO memory 152 waits before outputting the first processor input 124 to the third processor 158. For example, the first delay, the second delay, or both, may be a predetermined number of clock cycles for delaying based on the clock signal. To illustrate, the first delay, the second delay, or both, may be more than two clock cycles, providing a sufficient amount of delay in execution of the program code 118 allowing for detection of an error.

In one embodiment, the first FIFO memory 142 and the second processor 148 may represent a first FIFO-processor pair 140, and the second FIFO memory 152 and the third processor 158 may represent a second FIFO-processor pair 150. The first FIFO-processor pair 140, the second FIFO-processor pair 150, or both, may be incorporated in a computer chip. In a particular embodiment, the computer chip may be an application-specific integrated circuit (ASIC) or a field-programming gate arrays (FPGA). The first FIFO memory 142, the second FIFO memory 152, or both, may be designated in a portion of memory of the chip, which may include embedded random-access memory (RAM) or register array memory of the computer chip.

A port 160 of the removable computer card 130 may be configured to enable another computer system to access or configure the removable card 130. In one embodiment, the second computer system 180 may access the removable computer card 130 to control and monitor execution of the program code 118 when the second computer system 180 is operatively connected 162 to the removable computer card 130 via the port 160. For example, the port 160 may allow the second computer system 180 to access the contents of the first FIFO memory 142, the second FIFO memory 152, or both, to determine whether an indicator has been reached. In yet another example, the port 160 may enable the second computer system 180 to configure the first FIFO memory 142 for adjustment of the first delay, configure the second FIFO memory 152 for adjustment of the second delay, or both. Even further, the port 160 may enable the second computer system 180 to access system information from the second processor 148 and from the third processor 158 for debugging execution of the program code 118.

The removable computer card 130 may include a FIFO control register 166 to control the first FIFO memory 142, the second FIFO memory 152, or both. The second computer system 180 may access the FIFO control register 166 through the port 160. The FIFO control register 166 may be configured or modified to control depth or size of the FIFO memories 142, 152, which may affect the amount of the first delay at the first FIFO memory 142 and the second delay at the second FIFO memory 152. The FIFO control register 166 may be configured or modified to designate a location for the FIFO memories 142, 152 by allowing the user to modify computer storage designated for each of the FIFO memories 142, 152. In another embodiment, the FIFO control register 166 may be included within the second computer system 180, which may provide the user with a means for accessing the FIFO control register 166 as described herein.

In operation, the removable computer card 130 may be operatively coupled to the expansion slot 120. A user (e.g., a system administrator, an operator, or a tester) of the system 100 may start execution of the program code 118 at the first processor group 112. The first processor group 112 may receive a first processor input 124 and may execute program code 118 in response to the first processor input 124. The first FIFO memory 142 may receive the first processor input 124 from the first processor group 112. In one embodiment, the first processor input 124 is received by the first FIFO memory 142 before the first processor group 112 executes the program code 118 according to the first processor input 124. For example, the first processor input 124 may be sent to the first FIFO memory 142 and the first processor 114 at the same time. Alternatively, the first processor input 124 may be sent to the first FIFO memory 142 after the first processor group 112 has begun executing the program code 118 according to the first processor input 124. The first FIFO memory 142 may store the first processor input 124 and may output the first processor input 124 to the second FIFO memory 152 and the second processor 148 according to a first delay. The second processor 148 may execute the program code 118 responsive to the first processor input. The second FIFO memory 152 may store the first processor input 124 and may output the first processor input 124 to the third processor 158 according to a second delay. The third processor 158 may execute the program code 118 responsive to the first processor input 124.

In a particular embodiment, a failure point may be encountered while executing the program code 118 at the first processor group 112. The user may select one of the second processor 148 and the third processor 158 to analyze the execution of the program code 118 before the failure point. The user may establish an operative connection 162 from the second computer system 180 to the removable computer card 130 via the port 160 to access information on the removable computer card 130. The user may attempt to access the first FIFO memory 142 via the port 146, the second FIFO memory 152 via the port 156, or both ports 146, 156 may be operatively connected to the port 160 enabling access by the user. The user may attempt to access to the contents the first FIFO memory 142 or the second FIFO memory 152 to determine whether either of the second processor 148 or the third processor 158 executed the program code 118 past the failure point. The user may access system information of each of the second processor 148 and the third processor 158 to examine the state of the processors 148, 158 at or near the time the first processor 114 encountered the failure point. For example, the user may retrieve system information (e.g., bus trace, scan dump, and access registers) related to one or more of the processors 114, 148, 158 that may provide the user with information related to the state of one or more of processors 114, 148, 158. The user may retrieve additional system information by performing testing and applying debugging techniques (e.g., using a debugger, tracing, or dumping memory).

In one test scenario, the first delay and the second delay can be set so that each is not equal to the other, allowing the user to access system information from the second processor 148 based on the first delay and at a particular point in the execution of the program code 118 and then to modify the system information of the third processor 158 for the particular point, before execution of the program code on the third processor 158 according to the third delay.

Executing program code on multiple delayed processors may reduce the cost associated with execution of multiple instances of the program code on multiple processors, each situated within a separate processor system. A single computer system including multiple delayed processors may allow a user to emulate execution of multiple instances of the program code thereby eliminating a need for complete processor systems, arranged for lockstep processing, to execute multiple instances of the program code. Because execution of the program code is emulated on multiple delayed processors, a single system may be able to execute the program code on the single system while allowing the multiple delayed processors to use the system resources of the single system for execution of the program code. Executing the program code according to various delays may allow a user to verify or debug execution of the program code while the code is executing by analyzing the state of a non-delayed processor, any other delayed processor, using a set of input shared by the non-delayed processors with the delayed processors. The set of input may include input signals and corresponding data that identify a point in the execution of the program at the instance when the set of input is examined. Thus, at any given time when the set of input is examined before a delayed processor responds to the set of input, a user may identify a certain path taken within the program code and may indicate values of particular variables that further identify the state of the non-delayed processor at the given time.

In cases where a failure may occur infrequently or may be undiscovered due to the nature of the error, not appearing until execution after several clock cycles, the user may be assisted by being able to view the state of the system before one or more points of interest that may represent a failure point. Each delayed processor may provide the user with an opportunity to check the state of the non-delayed processor at a point of interest. Since each delayed processor is emulating the execution of the program code, modeling execution based on the execution of the non-delayed processor, each delayed processor may not encounter a distinct failure, except the failure encountered by the non-delayed processor. Thus, the user can focus on detecting the error of the non-delayed processor and may "rewind" the system to an earlier state to detect an otherwise undetectable error that may not become present until many cycles after the error is encountered.

A removable computer card (e.g., the removable computer card 130) may enhance the expandability of a test system (e.g., the system 100) with the addition of FIFO memory-processor pairs (e.g., the FIFO memory-processor pairs 140, 150) affording a user more processors to implement a delayed execution of program code (e.g., the program code 118). A removable computer card having more FIFO memory-processor pairs may provide more variation of delays during execution of the program code. Execution of the program code with short, intermittent delays may allow for isolation of a problem associated with a particular portion of the program code. For example, a tester may be provided with a greater ability to inspect otherwise unnoticeable system changes during execution of a particular portion of program code because short, intermittent delays enables the tester to inspect the system more frequently according to more frequent delays.

In a test environment, the removable computer card 130 may provide a tester with greater flexibility to utilize the removable computer card 130 on other test systems for further execution or analysis. The removable computer card 130 can be used on other test systems because the removable computer card 130 may require the system resources of the removable computer card 130 and the computer system board 110 of the computer system to which the removable computer card 130 may be operably connected.

Figure 2:
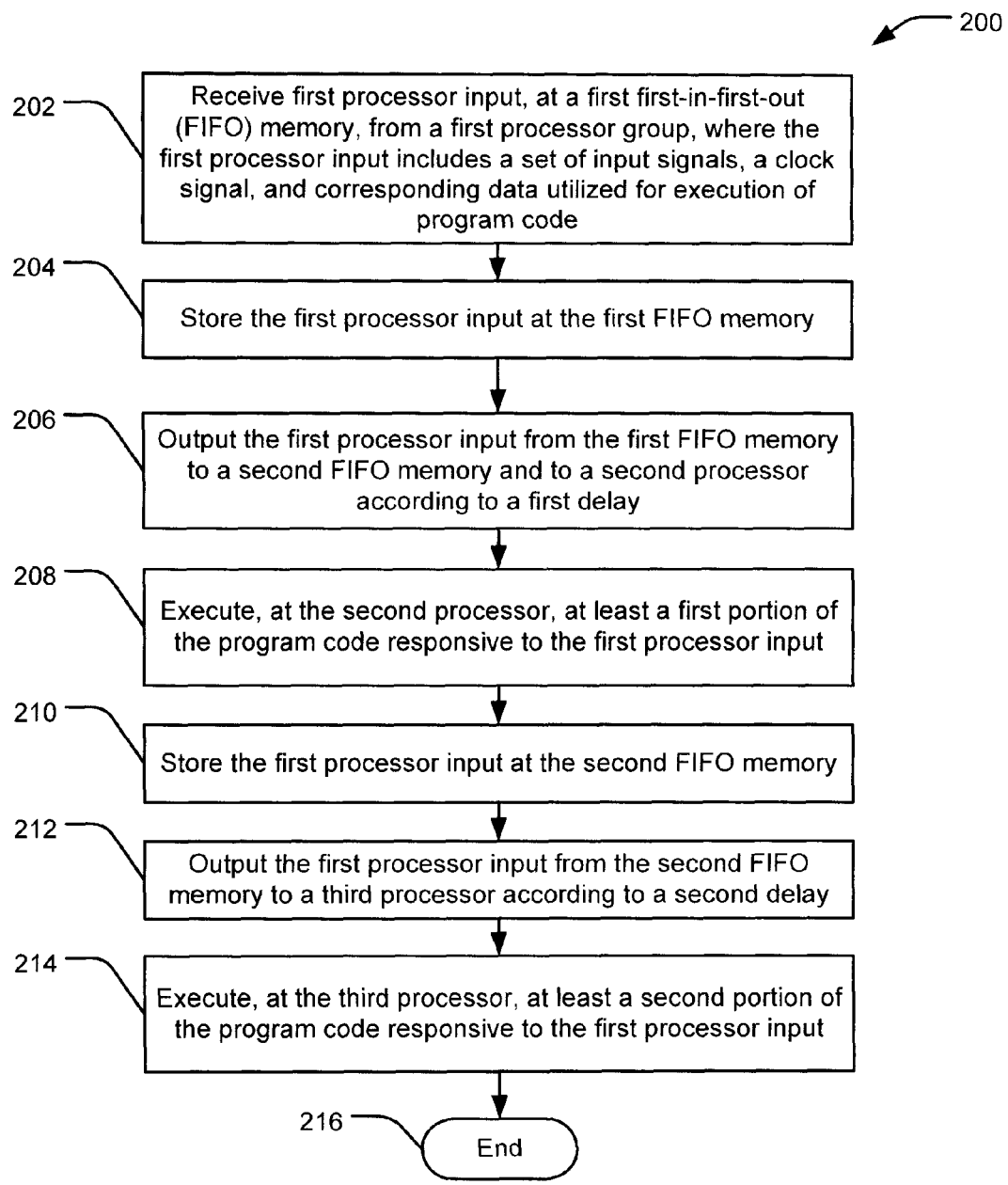
FIG. 2 is a flow diagram of a first particular embodiment of a method of executing program code on a second processor and a third processor according to a delay and responsive to input from a first processor group.

Now referring to FIG. 2, a flow diagram of a first particular embodiment of a method of executing program code on a second processor and a third processor according to a delay and responsive to input from a first processor group is depicted and generally designated 200. The method 200 may be performed by one or more of the systems 100, 500, 600, and 800.

At 202, a first FIFO memory may receive first processor input 124 from a first processor group. For example, in the computer system 100, the first FIFO memory 142 may receive the first processor input 124 from the first processor group 112. In one embodiment, the first processor input 124 is received before the first processor group 112 begins execution of the program code 118 in response to the first processor input 124. In another embodiment, the first processor input 124 is received after the first processor group 112 has begun executing the program code 118 according to the first processor input 124.

Continuing on to 204, the first FIFO memory may store the first processor input in the first FIFO memory. At 206, the first FIFO memory may output the first processor input to a second FIFO memory and to a second processor according to a first delay. For example, the first processor input may be stored at the first FIFO memory within cache lines of the first FIFO memory, where each cache line corresponds to the first processor input associated with each clock cycle based on the clock signal of the first processor input.

At 208, the second processor may execute at least a first portion of the program code responsive to the first processor input. At 210, the second FIFO memory may store the first processor input in the second FIFO memory. For example, the second FIFO memory, functioning similarly to the first FIFO memory, may store the first processor input within cache lines of the second FIFO memory, where each cache line corresponds to the first processor input associated with each clock cycle based on the clock signal of the first processor input.

At 212, the second FIFO memory may output the first processor input to a third processor according to a second delay. The third processor may execute at least a second portion of the program code responsive to the first processor input at 214. The method 200 may end at 216. Alternatively, the method 200 may continue with the first processor input being provided to one or more additional FIFO memories and with the program code being at least partially executed by one or more additional processors according to a delay. The method 200 enables execution of the program code according to various delays that may allow a user to verify or debug execution of the program code based on examining the first processor input stored within the first FIFO memory and the second FIFO memory. Further the user may be able to analyze the state of the second processor or the third processor based on examining the first processor input.

Figure 3:
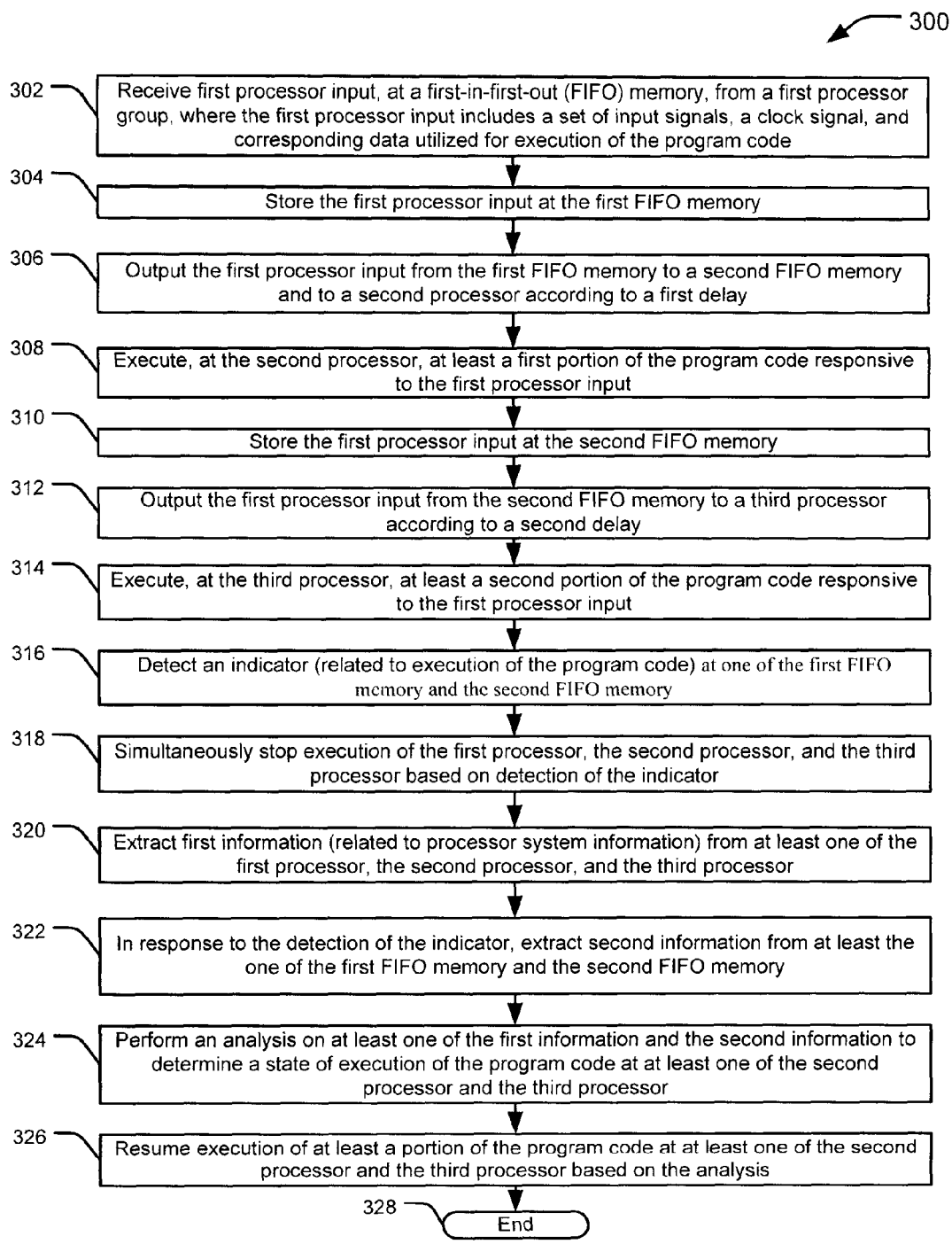
FIG. 3 is a flow diagram of a second particular embodiment of a method of executing program code on a second processor and a third processor according to a delay and responsive to input from a first processor group. The second particular embodiment includes detecting an indicator during execution of the program code.

FIG. 3 is a flow diagram of a second particular embodiment of a method of executing program code on a second processor and a third processor according to a delay and responsive to input from a first processor group, generally designated 300. The method 300 may be performed by one or more of the systems 100, 500, 600, and 800.

At 302, a first FIFO memory may receive a first processor input from a first processor group. At 304, the first FIFO memory may store the first processor input within the first FIFO memory. At 306, the first FIFO memory may output (according to a first delay) the first processor input from the first FIFO memory to a second FIFO memory and to a second processor. At 308, the second processor may execute at least a first portion of the program code responsive to the first processor input. At 310, the second FIFO memory stores the first processor input at the second FIFO memory. At 312, the second FIFO memory outputs the first processor input to a third processor according to a second delay. At 314, the third processor executes at least a second portion of the program code responsive to the first processor input. At 316, the user may detect indicators related to execution of program code, at one or both of the first FIFO memory and the second FIFO memory. For example, the indicator may be detected from a single bit that is enabled by configuration of the first FIFO memory or a second FIFO memory. The first FIFO memory or the second FIFO memory may be configured by programming logic within either FIFO memory that enables the single bit based on a condition related to the first processor input. At 318, based on detection of the indicator, execution of the first processor, the second processor, and the third processor may be simultaneously stopped. For example, execution of the first processor, the second processor, and the third processor may be stopped by disabling/stopping a clock of each of the processors. In another example, debugger software may be used to stop execution of each of the processors, where the debugger software is operably configured to control execution of the program code on each of the processors.

As explained above, the first FIFO memory, the second FIFO memory, or both, may be configured with an indicator related to execution of the program code. The indicator may be a marker, a control bubble, a flag, or any other type of control point used to identify a particular portion of the program code during execution. Configuration of the FIFO memory is not limited to an indicator. The first FIFO memory, the second FIFO memory, or both, may be configured or modified for a particular purpose relating to detection or monitoring during execution of the program code. For example, the indicator may be used for, but not limited to, applications such as testing, debugging, and analyzing the computer system 100 with respect to execution of the program code 118. In one instance, the indicator may be a bit or a flag inserted or programmed into an indicator logic (not shown) of the first FIFO memory 142 or the second FIFO memory 152.

At 320, first information may be extracted from at least one of the first processor, the second processor, and the third processor. The first information may relate to processor system information such as information concerning the state of the processors (e.g., the first processor, the second processor, and the third processor) related to execution of the program code. Such information may be used in the system 100 for debugging the program code 118 and analyzing hardware errors encountered during execution of the program code 118.

At 322, in response to detecting the indicator, second information may be extracted from at least one of the first FIFO memory and the second FIFO memory. The second information may relate to contents of the FIFO memory. For example, extracting the second information may be performed by accessing the first FIFO memory 142 or the second FIFO memory 152 via the second computer system 180.

At 324, analysis may be performed on at least one of the first information, the second information, or both, to determine a state of execution of the program code for at least one of the second processor and the third processor. For example, a user may desire to determine the state of execution of the program code on the second processor and the third processor to determine whether either has encountered the indicator, which may assist the user in selection of a processor to resume execution of the program code. The indicator may be associated with a particular portion of the program code where a failure is known to have occurred. Performing analysis on the first information may involve inspecting the processor system information for the second processor and the third processor to determine whether a particular register or particular portion of memory indicates the existence of the failure. The user may perform analysis on the second information to determine the execution of the program code on the second processor and the third processor with respect to the indicator, which may be identified from the contents of the FIFO memory. Based on the analysis, the user can select a processor to resume execution of the program code for the processor that has not executed past the indicator and has not executed past the failure.

At 326, execution may be resumed on at least one of the second processor and the third processor for at least a portion of the program code. The method 300 ends at 328.

Figure 4:
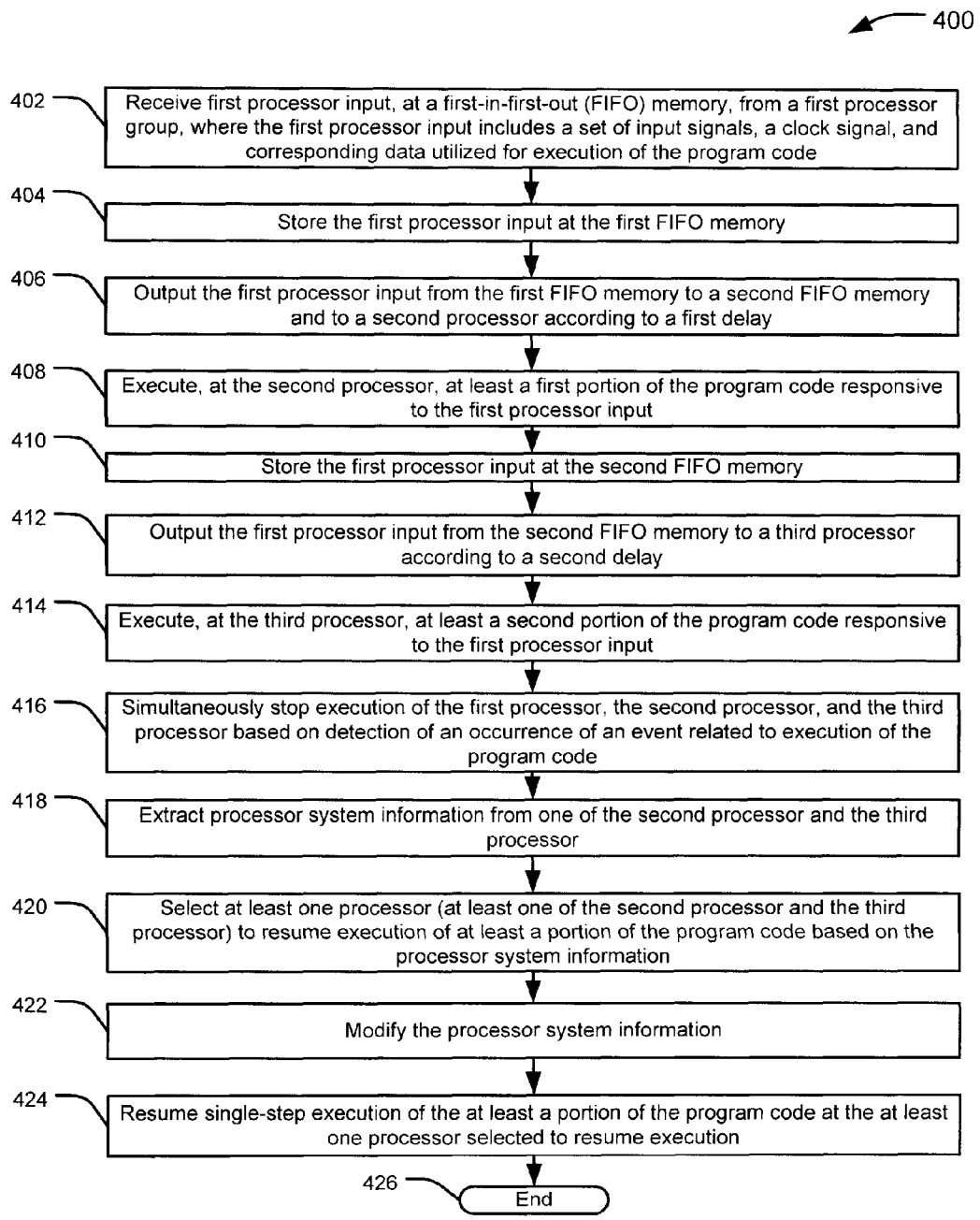
FIG. 4 is a flow diagram of a third particular embodiment of a method of executing program code on a second processor and a third processor according to a delay and responsive to input from a first processor group. The third particular embodiment is includes detecting an occurrence of an event related to the execution of the program code.

FIG. 4 is a flow diagram of a third particular embodiment of a method of executing program code on a second processor and a third processor according to a delay and responsive to input from a first processor group, generally designated 400. The method 400 may be performed by one or more of the systems 100, 500, 600, and 800.

At 402, a first FIFO memory may receive first processor input from a first processor group. At 404, the first FIFO memory may store the first processor input within the first FIFO memory. The first FIFO memory may output the first processor input from the first FIFO memory to a second FIFO memory and to a second processor according to a first delay, at 406. At 408, the second processor may execute at least a first portion of the program code responsive to the first processor input. For example, in response to the first processor input 124, the second processor 148 may execute an earlier part (a first portion) of the program code 118 that the first processor 114 executed because the second processor 148 is executing according to the first delay.

The second FIFO memory may store the first processor input at the second FIFO memory, at 410. At 412, the second FIFO memory may output the first processor input to a third processor according to a second delay. The third processor may execute at least a second portion of the program code responsive to the first processor input at 414.

At 416, based on detection of an occurrence of an event related to execution of the program code, execution of the first processor, the second processor, and the third processor may be stopped simultaneously. At 418, processor system information may be extracted from at least one of the second processor and the third processor. For example, the system information may include contents of registers, memory, and other system related information that identifies execution of the program code that is accessible from each of the processors. At least one processor (e.g., the second processor or the third processor) may be selected to resume execution of at least a portion of the program code based on analyzing the processor system information, at 420. For example, the user may analyze the registers and the memory of the processor system information to detect an occurrence of a known hardware failure during the execution of the program code. The occurrence of the hardware failure may be detected using the contents of the memory or the register, either of which may have changed to an incorrect value that is the result of the hardware failure that would otherwise be undetectable until a later time when the program code executes based on the incorrect value. As explained above in regards to the computer system 100 of FIG. 1, analyzing the processor system information may involve determining a state of execution of the program code 118 for at least one of the second processor 148 and the third processor 158.

At step 422, the processor system information of the at least one processor selected to resume execution may be modified, at 420. For example, the second computer system 180 of FIG. 1 may access the second processor 148 and the third processor 158 to modify the system information of either of the second processor 148 or the third processor 158. To illustrate, the user may have determined, at 420, that the contents of a particular register have a value that indicates a particular type of hardware error. To test a potential solution based on specifying a particular value in a different register of the selected processor, the user may modify the processor system information of the selected processor to determine whether the potential solution is viable when the user resumes execution of the program code on the selected processor.

At 424, single-step execution of at least a portion of the program code may be resumed for at least one of the second processor 148 and the third processor 158. For example, single-step execution may be performed by using debugger software that supports controlled operation of program code. Executing by single-steps may allow the user to execute the program code until a failure point occurs or until some other point of interest occurs that may allow the user to understand the environment or execution of the program code at the failure point. The method 400 ends at 426.

Figure 5:
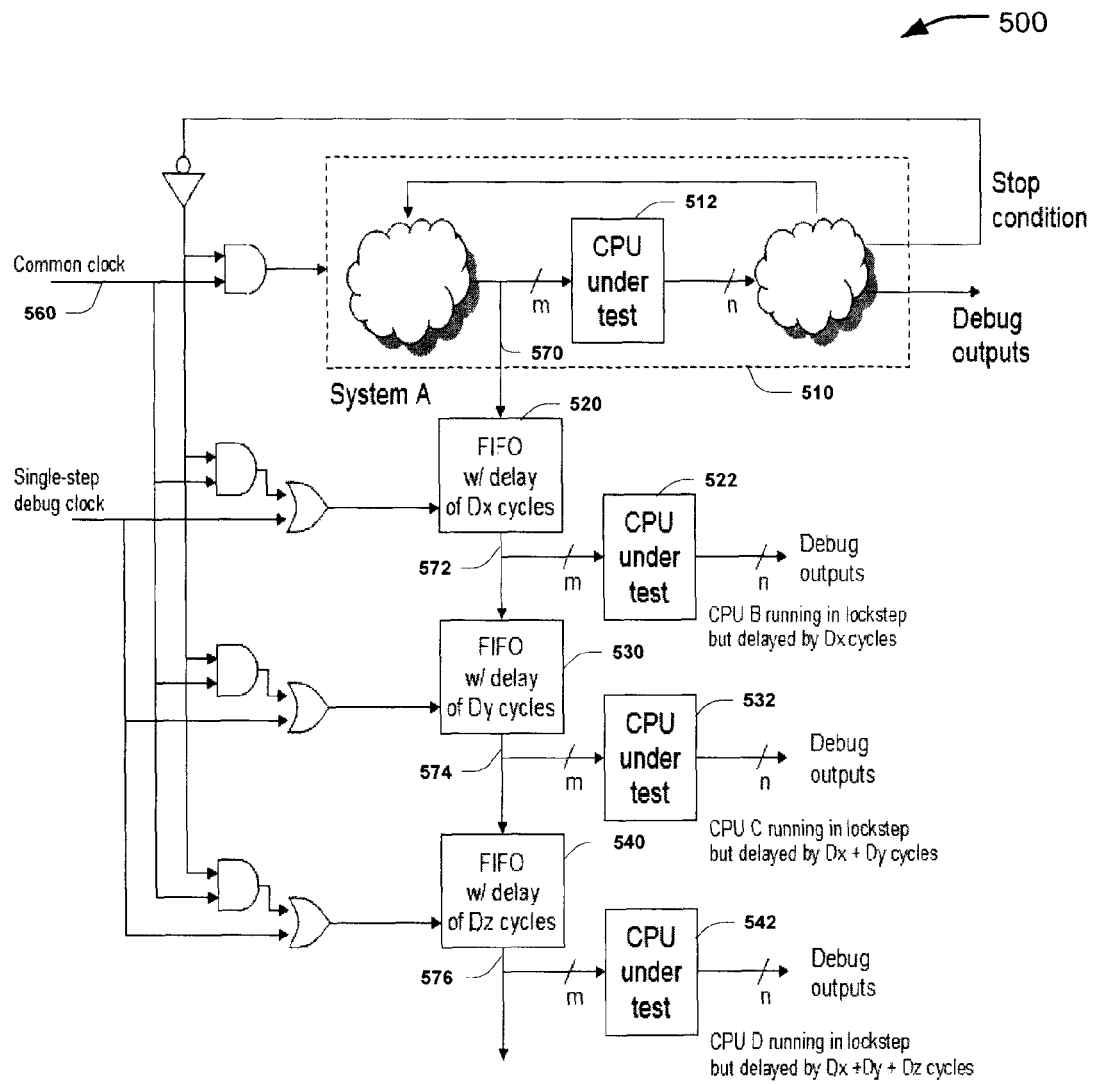
FIG. 5 is a block diagram of a second particular embodiment of a system that executes program code on a second processor and a third processor according to a delay and responsive to input from a first processor group.

FIG. 5 is a block diagram of a second particular embodiment of a system that executes program code on a second processor and a third processor according to a delay and responsive to input from a first processor group, generally designated 500. In the system 500, a System A 510 represents a first processor group that may include a central processing unit (CPU) under test 512 executing program code based on a set of input signals. A plurality of delayed CPUs under test (e.g., CPU B 522, CPU C 532, and CPU D 542) may each execute the program code according to different delays in clock cycles (e.g., Dx cycles, Dy cycles, and Dz cycles) based on a set of input signals 570 that includes a clock signal provided by a common clock input 560 to the System A 510.

Each of the delayed CPUs under test 522, 532, 542 may operate as an emulated CPU operating in lockstep with the System A 510. Each of the delayed CPUs under test 522, 532, 542 may operate without a complete set of system resources, unlike the System A 510, and may execute the program code according to a delay based on clock cycles. Each of the CPUs under test 522, 532, 542 may receive the same set of input signals 570 received by the System A 510, including signals corresponding to data and instructions related to execution of the program code. The output from each of the delayed CPUs under test 522, 532, 542 may not be utilized by the system 500 for execution of subsequent portions of program code. For example, when the CPU 512 of the System A 510 incurs a cache miss for requested data from memory of the System A 510, the same result (i.e., the cache miss) from the memory would go to each of the CPUs under test 522, 532, 542. Each of the CPUs under test 522, 532, 542 would execute according to the same cache miss as the System A 510 based on the same set of input signals 570 of the System A 510. Thus, each of the CPUs under test 522, 532, 542 may be delayed according to a delay based on clock cycles.

The delay for each of the CPUs under test 522, 532, 542 may be based on output of the set of input signals 570 from one of FIFO memory 520, 530, 540 according to the delay. The System A 510 may output the set of input signals 570 to a first FIFO memory 520 connected to the System A 510. The first FIFO memory 520 may output the set of input signals 570 to the first CPU under test 522 and the second FIFO memory 530 according to a first delay. The second FIFO memory 530 may output the set of input signals 570 to the second CPU under test 532 and the third FIFO memory 540 according to a second delay. The third FIFO memory 540 may output the set of input signals 570 to the third CPU under test 542 according to a third delay.

Execution of the program code on the CPU 512 and each of the CPUs under test 522, 532, 542 may be stopped simultaneously to preserve the states of each of the CPUs under test 522, 532, 542, which are different that a state of the CPU 512 because of the delays associated with the set of input signals 570 at each of the FIFO memory 520, 530, 540. Thus, the user may "rewind" the system to an earlier state on one of the CPUs under test 532, 542 to detect an otherwise undetectable error that may not become present until many cycles after the error is encountered.

Connecting the CPUs under test 522, 532, 542 as in the system 500, may enable a system administrator (e.g., a tester and an operator) to monitor the execution of the program code for the CPU under test 512 of the System A 510. One way to monitor the execution of the program code is to access contents of one or more of the FIFO memories 520, 530, 540 and to format the contents of the one or more of the FIFO memories 520, 530, 540 into an event trace that may show changes associated with the input signals at each clock cycle. The system administrator may selectively "rewind" the execution of the program code in the system 500 based on viewing one or more event traces of the contents of the one or more of the FIFO memories 520, 530, 540. When the system administrator stops execution of the program code on all the CPUs under test 522, 532, 542, the system administrator may inspect state information for each of the CPU under test 522, 532, 542 to perform further analysis with respect to the execution of the program code. Further, the system administrator may "rewind" the execution of the program code by selectively restarting execution of the program code at one of the CPUs under test 522, 532, 542 until a point of interest is identified. The system administrator may then be able to view the input provided from the System A 510 according to each clock cycle. The system administrator may perform single-step execution of the program code on a selected CPU of the CPUs under test 522, 532, 542, where the selected CPU under test is used to locate a point of interest based in part on the input to the selected CPU under test.

Figure 6:
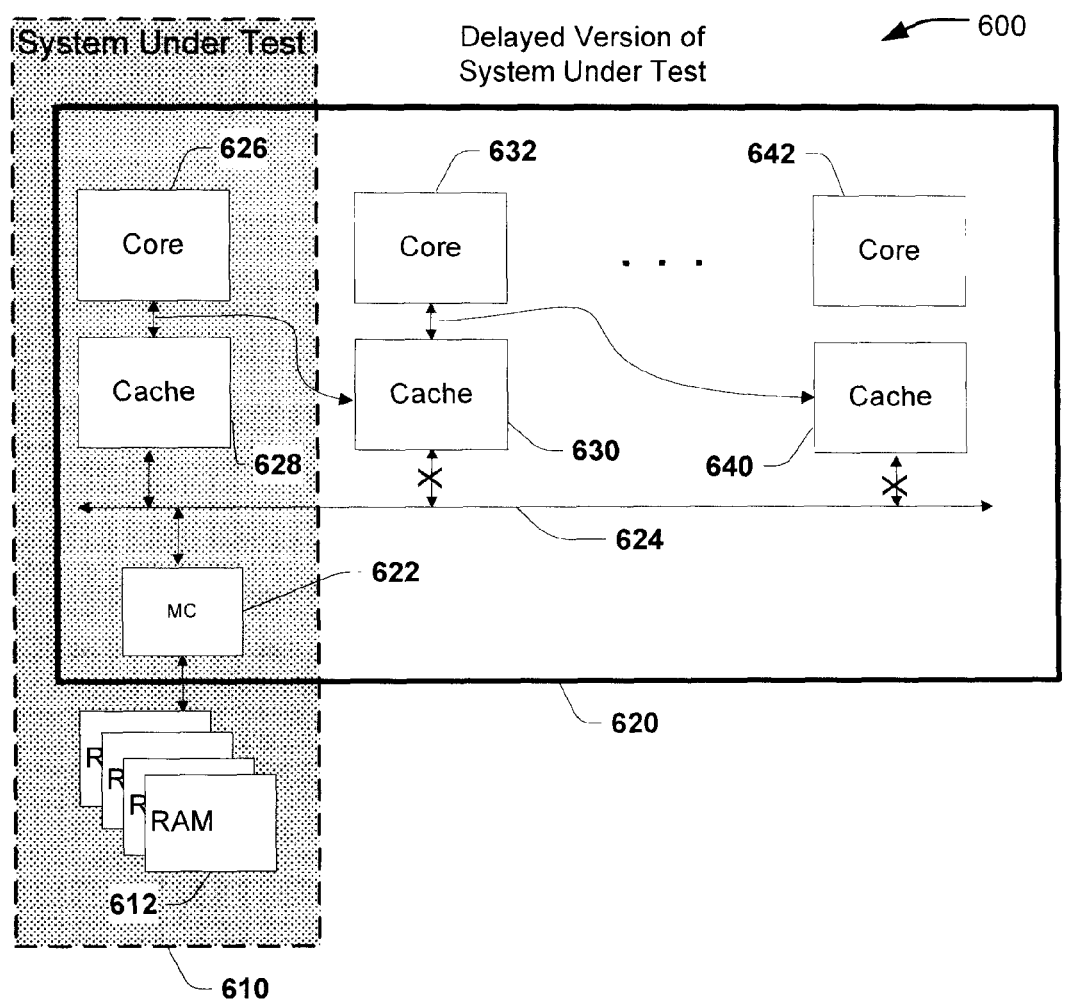
FIG. 6 is a system diagram of a third particular embodiment of a system that executes program code on a second processor and a third processor according to a delay and responsive to input from a first processor group.

FIG. 6 is a system diagram of a third particular embodiment of a system that executes program code on a second processor and a third processor according to a delay and responsive to input from a first processor group, generally designated 600. The system 600 includes a System Under Test 610. The System Under Test 610 may include a computer chip 620 with multiple cores (e.g., processor cores) 626, 632, 642 that may each be capable of using the system resources of the System Under Test 610 to perform processing operations. The cores 626, 632, 642 may be interconnected in series, and each of the cores 626, 632, 642 may be associated with a separate and distinct cache 628, 630, 640. For example, the cache 628, 630, 640 associated with each core 626, 632, 642 may be a cache inside the core. The cores 626, 632, 642 and the caches 628, 630, 640 may be interconnected by cache control logic and interconnecting lines.

During operation, the first core 626 may execute program code according to a single set of input that may be provided by a system input bus 624 of the computer chip 620. A memory controller (MC) 622 coupled to the system input bus 624 and in communication with the computer chip 620 may access memory of the System Under Test 610, such as random-access memory (RAM) 612, for the program code. Each core 626, 632, 642 may be responsive to the single set of input for execution of the program code. The single set of input may include a set of input signals, a clock signal, and corresponding data related to execution of the program code. In a particular embodiment of the system 600, the System Under Test 610 may be configured so that the first core 626, which may include a series of cores (not shown), may execute the program code in response to receiving the single set of input from the cache 628 that outputs the single set of input without a delay. In another particular embodiment of the system 600, the cache 628 may delay output of the single set of input to the first core 626 according to a delay associated with the clock signal.

The System Under Test 610, may output the set of input to the cache 630 before, during, or after the core 626 executes the program in response to the single set of input. The cache 630 may output the single set of input to the core 632 and a subsequent cache (e.g., 640) according to a first delay. The core 632 may execute the program code in response to the single set of input. The cache 640 may output the single set of input to the core 642 according to a second delay. In an embodiment of the system 600, the system 600 may include one or more additional cores and an additional cache corresponding to each additional core. Each of the additional caches may function similarly to the caches 628, 630, 640 by receiving the single set of input from another cache, such as another cache 630, 640 and by outputting the single set of input to one of the additional cores 632, 642 according to a delay.

Each of the caches 628, 630, 640 may store the single set of input such that one clock cycle of the clock signal corresponds to a cache line. The size of each of the caches 628, 630, 640 may depend on several factors, including cache type, storage capacity, and storage considerations based on the amount of data associated with the single set of input for one clock cycle, or any combination thereof.

The computer chip 620 may be a multicore processor including multiple cores, each associated with one cache. An implementation of the system 600 using a single computer chip may reduce the cost of hardware associated with implementing a test system supporting multiple core processors for execution of program code according to various time delays on each of the multiple core processors. The implementation may decrease the amount of hardware that would otherwise be required to support execution of program code on independent systems, such as the System Under Test 610, each independent system utilizing a distinct set of system resources.

Figure 7:
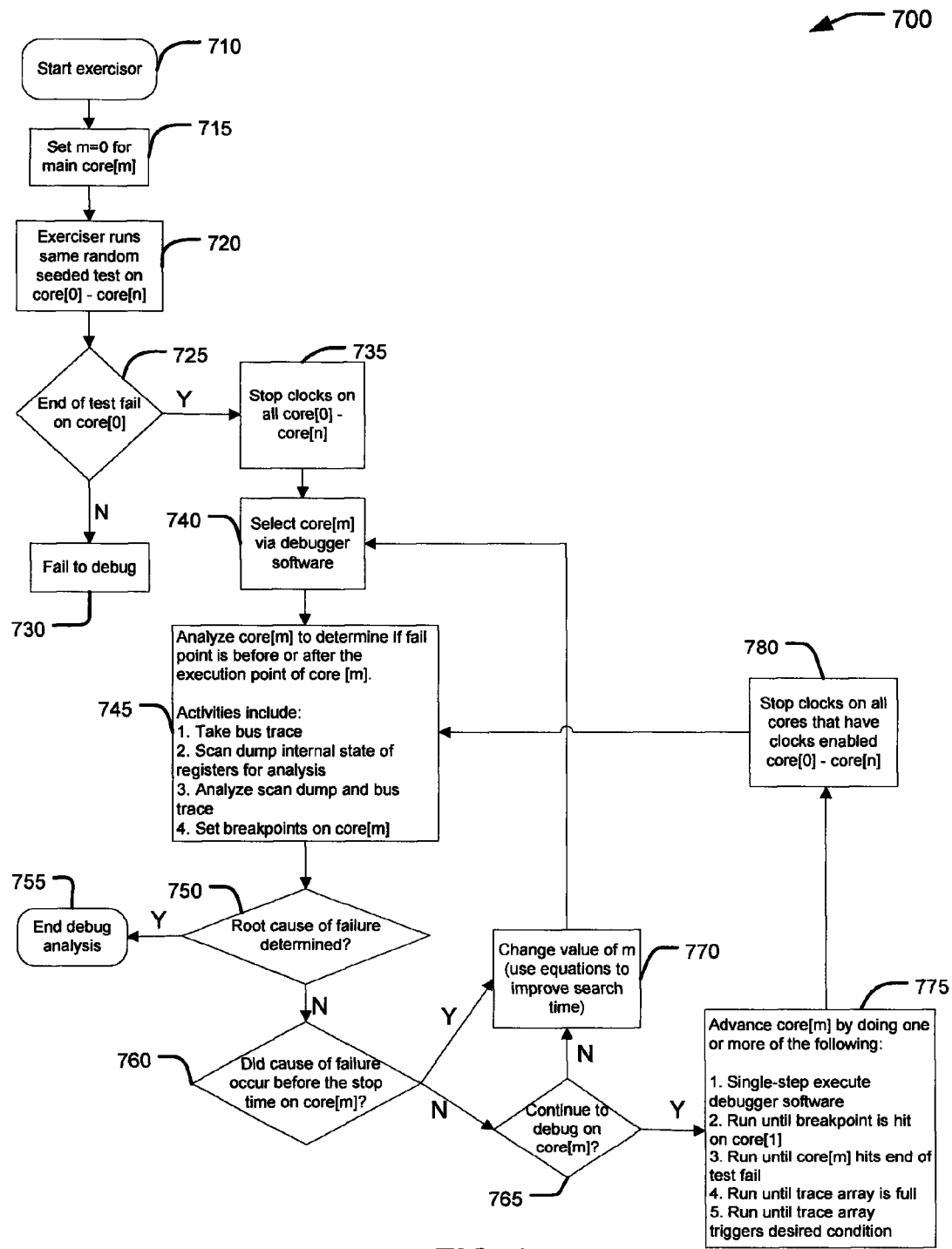
FIG. 7 is a flow diagram of a fourth particular embodiment of a method of executing program code on a second processor and a third processor according to a delay and responsive to input from a first processor group.

FIG. 7 is a flow diagram of a fourth particular embodiment of a method of executing program code on a second processor and a third processor according to a delay and responsive to input from a first processor group, generally designated 700. The method 700 may be performed by at least one of the systems 100, 500, 600, and 800.

At 710, a user (e.g., an administrator, an operator, or a tester) may begin execution of a hardware exerciser program on each core of the system. A hardware exerciser is a program for generation and testing of test software used to test computer hardware. STPSM, HTX, Trash and Grub are examples of stand-alone hardware exercisers. These hardware exercisers may generate tests directly in memory and may branch to a test area to perform the actual test based on one of the generated tests. The cores that execute the hardware exerciser are represented by core[0]-core[n], where core[m] represents the main core, not associated with a time delay, where the hardware exerciser executes. At 715, the user may choose the core[m] from one of the available cores, core[0]-core[n]. At 720, the user may execute a random seeded test, generated by the hardware exerciser, on each of the cores, core[0]-[n].

At 725, upon completion of the hardware exerciser on at least one of the cores, the user may determine whether one of the cores encountered a failure during the execution of the hardware exerciser. At 730, the method 700 ends with a failure to debug when the hardware exerciser completes execution of the random seeded test without encountering a failure.

The method 700 continues upon determining that an error occurred during execution of the hardware exerciser. At 735, a clock signal on each of the cores is stopped to halt execution of the hardware exerciser on each core. The user may identify a particular core that failed during execution of the hardware exerciser and locate a point of failure related to execution of the hardware exerciser on the particular core. Alternatively the user may identify a point of interest in execution of the hardware exerciser relative to the occurrence of the failure on at least one core. In a particular embodiment, the user may selectively analyze at least one of the cores executing according to a delay that has not encountered the point of failure. In order to assist the user with performing the analysis, the user may configure the system to utilize debugger software (e.g., RiscWatch) in conjunction with the execution of the hardware exerciser on each core. By analyzing each core after the clock signal has been stopped, the user may identify a core, executing according to a delay, that stopped execution of the hardware exerciser just prior to a point of interest that is prior to or coincides with the point of failure.

At 740, the user may select a core on which execution stopped at a point of interest before the failure point with assistance of the debugger software. The main core (i.e., core[m]) is changed to the selected core. At 745, the user may analyze the selected core (i.e., core[m]). Analyzing the selected core may include performing one or more of a variety of tasks to determine a state of the core. For example, the user may extract a bus trace of the system input bus, perform a scan dump of the processor core, and analyze at least one of the trace and the dump.

At 750, the user may make a determination as to whether a root cause of the failure in the hardware exerciser has been identified. When analysis of the state of the core[m] provides sufficient information to determine the root cause of the failure, the user proceeds to 755 where debug analysis using the hardware exerciser ends and where the method 700 is complete. When the analysis of the state of the core[m] does not provide sufficient information to determine the root cause of the failure, the method 700 proceeds to 760.

At 760, to perform further analysis on the core[m], a determination is made whether the failure occurred at a point in execution of the hardware exerciser before the stop time on the core[m]. When the failure occurred after the stop time on the core[m], the method 700 continues by selecting another value of m to change the core[m] that is being analyzed, at 770. The user may apply an equation, such as a binary search, to select the next core for analysis.

When the failure occurred before the stop time on the core[m], a determination may be made whether to continue to debug the core[m] to determine the cause of the failure, at 765. For example, the user may conclude that debugging is complete on the core[m], although the core[m] stopped execution before the failure point. In one instance, the user may determine that the core[m] stopped execution before the failure point, but after a point of interest that would allow the user to better understand the failure. The user may select, by changing the value of m, one of the cores, core[0]-core[n], to represent the new core[m] that is different from the current core[m], at 770. The user may also utilize the debugger to set breakpoints associated with execution of the hardware exerciser on the core[m] by using the debugger software to set one or more breakpoints to indicate a point of interest in the code of the hardware exerciser.

The method 700 may continue at 775 to resume execution on core[m]. Execution on core[m] may proceed by advancing the processing of the hardware exerciser in a variety of ways. Utilizing the debugger software, the user may resume the hardware exerciser on the selected core[m] by performing single-step execution. For example, the debugger software can be used to perform single-step execution of the hardware exerciser to analyze execution of the hardware exerciser when a breakpoint is reached. The user may resume execution until core[m] reaches the failure point, at which point execution of the hardware exerciser may be stopped. The user may resume execution of the hardware exerciser until a trace array triggers a desired condition.

At 780, when execution of the hardware exerciser on core [m] stops, execution may be stopped on each of the cores, core[0]-core[n], that have a clock that is enabled. Returning to 745, analysis of the current core[m] may be performed to determine the root cause of the failure. When the root cause of the failure is determined, the method 700 proceeds to 755, where the method 700 ends.

The method 700 may enable identification of a point of interest related to the execution of the program code before a failure point in execution of the program code. Identifying the point of interest may enable one to perform a cause and effect analysis to determine the circumstances leading to the failure.

Figure 8:
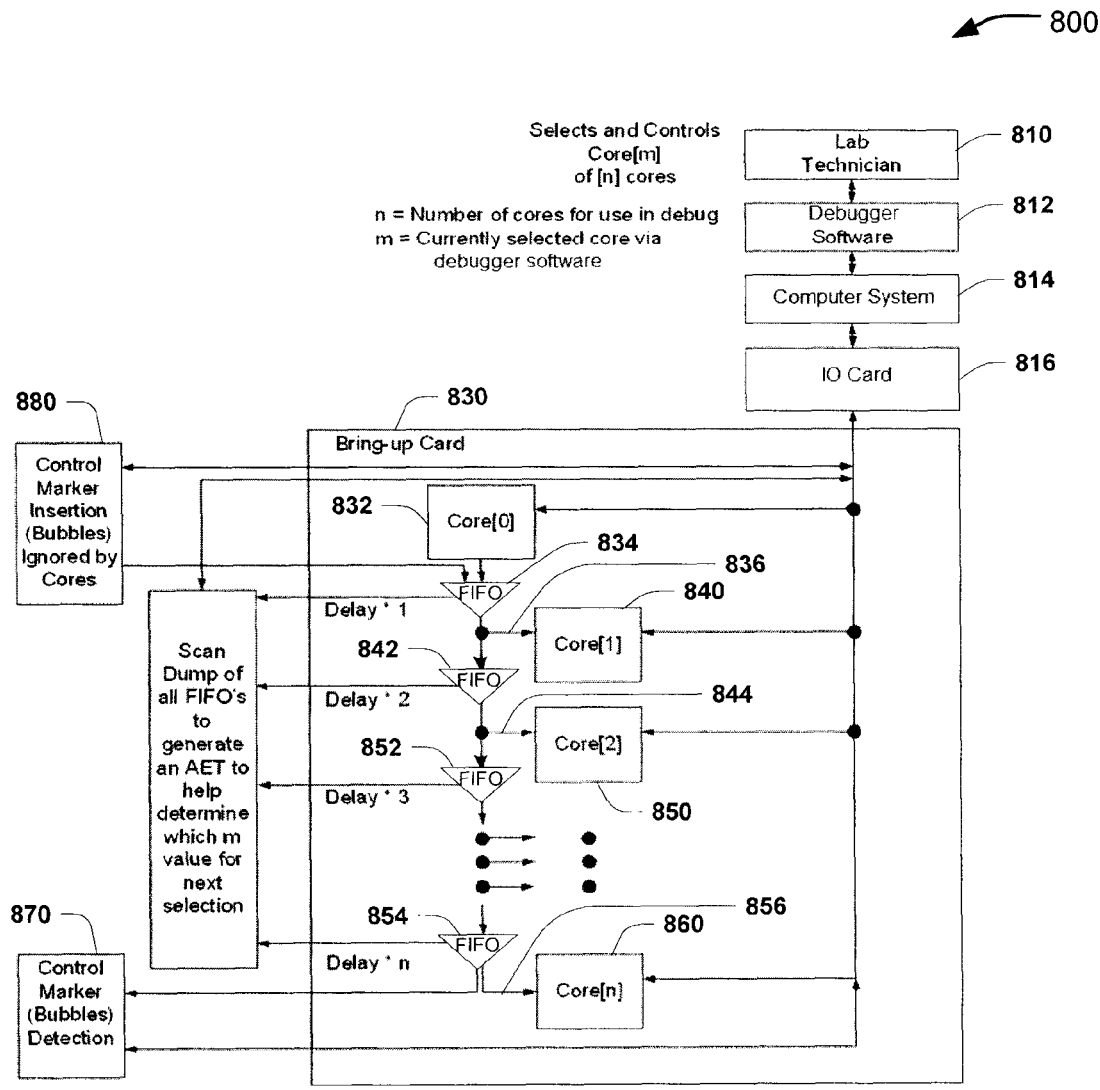
FIG. 8 is a block diagram of a fourth particular embodiment of a system that executes program code on a second processor and a third processor according to a delay and responsive to input from a first processor group.

FIG. 8 is a block diagram of a fourth particular embodiment of a system that executes program code on a second processor and a third processor according to a delay and responsive to input from a first processor group, generally designated 800. The computer system 800 may include a computer system 814 that may be controlled by a user (e.g., a lab technician, a system administrator, or an operator) 810. The system 800 may be used to execute program code (e.g., a hardware exerciser, a test program, or a test case), with assistance of a debugger software 812, on one of several delayed processor cores (e.g., core[0], core[1], core[2], . . . , core [n]) 840, 850, 860, each delayed processor core 840, 850, 860 implemented so that input 836, 844, 856 to each delayed processor core 840, 850, 860 is provided according to a delay. The delayed processor cores 840, 850, 860 may be included on a lab test computer card (e.g., a lab bring-up card) 830. The lab test computer card 830 may be expanded to include additional delayed processor cores as needed based on a determination by the user 810. For example, FIG. 8 shows an implementation of a lab test computer card 830 that may be on an input/output card (IO Card) connected to a slot 816 associated with the computer system 814. For illustration, the system 800 may correspond to the computer system 100, and the lab test computer card 830 may be the removable computer card 130 that is configured to be connected to the expansion slot 120.

The lab test computer card 830 may include several delayed processor cores 840, 850, 860 that may be provided a set of input 836, 844, 856 according to a delay. The processor cores 840, 850, 860 may be interconnected in series, each receiving the set of input 836, 844, 856 for execution of the program code from Core[0] 832 that is provided with the set of input by the computer system 814. Each processor core 840, 850, 860 may receive the input 836, 844, 856 according to a delay from a FIFO memory 834, 842, 854 associated with the processor cores 840, 850, 860. The FIFO memories 834, 842, 852, 854 can be chained in a series such that each FIFO memory 834, 842, 852, 854 receives the set of input from a previous FIFO except for the first core 832 that initially receives the set of input from the computer system 814. The number of processor cores that may be configured on the lab test computer card 830 may be determined based on a variety of factors, such as the capacity of a lab test computer card to hold processor cores and the type of the processor cores.

The user may modify the lab test computer card 830 to identify a point or points of interest associated with execution of program code. For example, the user may modify or insert logic in one or more FIFO memories 834, 842, 852, 854 to place a marker or a set of markers (e.g., a flag, an indicator, or a bubble) associated with a particular portion of the program code. The user may subsequently perform a scan dump of one or more of the FIFO memories to generate an all events trace (AET) that may help the user determine the next processor core to focus on for a particular point of interest related to execution of the program code. Further, the use of a marker may allow the user to establish a state machine or apply an algorithm to focus on one or more events related to execution of the program code.

Figure 9:
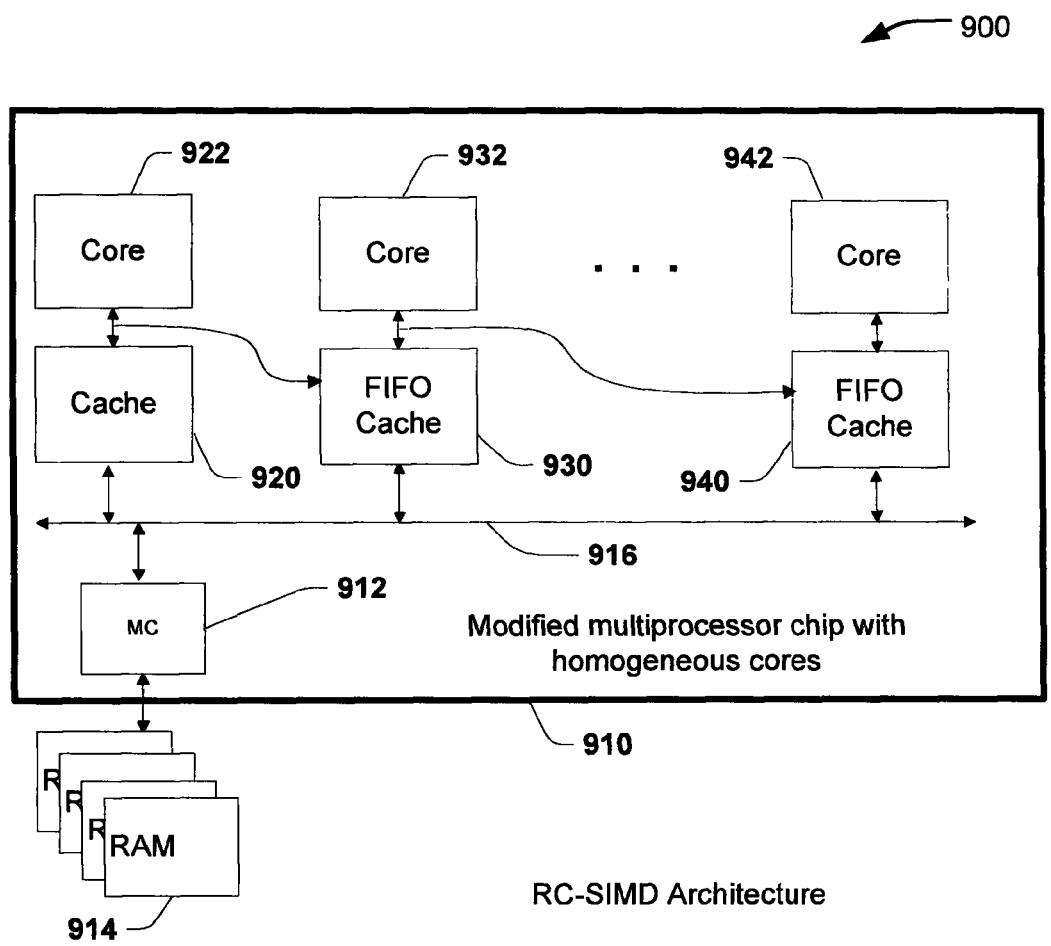
FIG. 9 is a system diagram of a fourth particular embodiment of a system that executes a set of instructions on a second processor and a third processor according to a delay and responsive to input from a first processor group.

FIG. 9 is a system diagram of a fourth particular embodiment of a system that executes a set of instructions on a second processor and a third processor according to a delay and responsive to input from a first processor group, the system generally designated 900.

The system 900 includes a computer chip 910 with multiple, homogeneous cores (e.g., processor cores) 922, 932, 942 that may each be capable of using a set of system resources available within the computer chip 910 to perform processing operations. The cores 922, 932, 942 may be interconnected in series, and each of the cores 922, 932, 942 may be associated with a separate and distinct FIFO cache 920, 930, 940. For example, the cache 920, 930, 940 associated with each core 922, 932, 942 may be a cache inside the core. The cores 922, 932, 942 and the caches 920, 930, 940 may be interconnected by cache control logic and interconnecting lines. Each of the caches 920, 930, 940 may be coupled to a system input bus 916 of the computer chip 910. The system input bus 916 may be coupled to a memory controller (MC) 912 of the computer chip 910. The MC 912 may access memory 914, such as random-access memory (RAM). The memory may be on board the computer chip 910 or remote from and coupled to the computer chip 910. The memory 914 may include a set of instructions accessible by the MC 912.

During operation, the first core 922 may execute the set of instructions according to a single set of input from the system input bus 916. The MC 912 may access the memory 914 to obtain the set of instructions. Each core 922, 932, 942 may be responsive to the single set of input for execution of the set of instructions. The single set of input may include, for example, a set of input signals, a clock signal, and corresponding data related to execution of the set of instructions. A set of data may be obtained from the memory 914 and provided to each cache 920, 930, 940 by the MC 912. Each cache 920, 930, 940 may provide the set of data to each core 922, 932, 942 connected to the cache. In a particular embodiment, the set of data may be unique with respect to each core 922, 932, 942. In another particular embodiment of the system 900, the cache 920 may output the single set of input without delay to the first core 922 and the first core 922 may execute the set of instructions in response to receiving the single set of input from the cache 920. In another particular embodiment of the system 900, the cache 920 may delay output of the single set of input to the first core 922 according to a delay associated with the clock signal.

The single set of input provided to the core 922 may be output to the cache 930 before, during, or after the core 922 executes the set of instructions in response to the single set of input. The cache 930 may output the single set of input to the core 932 and a subsequent cache (e.g., 940) according to a first delay. The core 932 may execute the set of instructions according to the set of data obtained from the memory 914 and in response to the single set of input. The cache 940 may output the single set of input to the core 942 according to a second delay. The core 942 may execute the set of instructions according to the set of data obtained from the memory 914 and in response to the single set of input. In an embodiment of the system 900, the computer chip 910 may include one or more additional cores and one or more additional cache corresponding to each additional core. Each of the additional caches may function similarly to the caches 920, 930, 940 by receiving the single set of input from another cache and by outputting the single set of input to one of the additional cores according to a delay. Each of the additional caches may receive the set of data obtained from the memory 914 that is provided via the MC 912. Each of the additional caches may provide the set of data to the additional cores connected to the additional cache.

Each of the caches 920, 930, 940 may store the single set of input such that one clock cycle of the clock signal corresponds to a cache line. The size of each of the caches 920, 930, 940 may depend on several factors, including cache type, storage capacity, and storage considerations based on the amount of data associated with the single set of input for one clock cycle, or any combination thereof.

The computer chip 910 may be a multicore processor that includes multiple cores, each core associated with a cache. In one embodiment, an implementation of the computer chip 910 may represent computer architecture that functions similar to that of a reconfigurable single instruction multiple data (RC-SIMD) architecture. However, the implementation may differ from a traditional implementation of RC-SIMD architecture in that a single set of input is provided to each core 922, 932, 942 to allow each core 922, 932, 942 to execute a set of instructions based on a single set of system resources. The implementation may function similar to the traditional implementation of the RC-SIMD architecture such that the system input bus 916 may support a set of delay-lines, allowing the set of data to be distributed to the caches 920, 930, 940 based on time according to the set of delay-lines. The implementation may allow each of the set of delay-lines of the system input bus 916 to be reconfigured so that the set of data provided to each of the caches 920, 930, 940 are distinct. An implementation of the system 900 having a single computer chip may function similar to RC-SIMD architecture by supporting execution of multiple workloads (e.g., multimedia workloads), represented by a set of instructions, according to various time delays on each of the multiple core processors. Executing a set of instructions according to a delay on a computer chip according to the system 900 may help regulate processor-memory traffic so that each processor (or core) does not attempt to access memory at the same instant. The implementation may reduce the cost of hardware associated with implementing the RC-SIMD architecture by decreasing the amount of hardware used to support execution of the set of instructions on independent systems, which each use a separate set of system resources for execution of the set of instructions on each processor.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
    receiving first processor input, at a first first-in-first-out (FIFO) memory, from a first processor group that comprises a first processor, wherein the first processor group is configured to execute program code based on the first processor input, the first processor input comprising a set of input signals, a clock signal, and corresponding data utilized for execution of the program code;
    storing the first processor input at the first FIFO memory;
    outputting the first processor input from the first FIFO memory to a second FIFO memory and to a second processor, wherein the second processor is coupled to the first FIFO memory, wherein the first processor input is output to the second processor according to a first delay;
    executing, at the second processor, at least a first portion of the program code responsive to the first processor input;
    outputting the first processor input from the second FIFO memory to a third processor coupled to the second FIFO memory, wherein the first processor input is output to the third processor according to a second delay;
    executing, at the third processor, at least a second portion of the program code responsive to the first processor input;
    extracting first information from at least one of the first processor, the second processor, and the third processor after simultaneously stopping execution of the first processor, the second processor, and the third processor, wherein the first information relates to processor system information;
    detecting an indicator at at least one of the first FIFO memory and the second FIFO memory, wherein the indicator is related to the execution of the program code, and wherein the simultaneously stopping execution of the first processor, the second processor, and the third processor is based on detection of the indicator;
    in response to the detection of the indicator, extracting second information from the at least the one of the first FIFO memory and the second FIFO memory, wherein the second information relates to contents of the at least one of the first FIFO memory and the second FIFO memory from which the second information was extracted; and
    performing an analysis on at least one of the first information and the second information to determine a state of execution of the program code at at least one of the second processor and the third processor.

2. The method of claim 1, wherein the first delay and the second delay are each more than two clock cycles, and the first delay is not equal to the second delay.

3. The method of claim 1, wherein the first delay and the second delay are based on a delay of the clock signal, wherein the first delay and the second delay correspond to a different number of clock cycles.

4. The method of claim 1, wherein the first FIFO memory and the second FIFO memory are configurable to be disabled, wherein the second processor is disabled for execution of the program code when the first FIFO memory is disabled and wherein the third processor is disabled for execution of the program code when the second FIFO memo is disabled.

5. The method of claim 1, wherein the indicator includes one of a marker, a control bubble and a flag.

6. The method of claim 1, further comprising resuming execution of at least a portion of the program code at at least one of the second processor and the third processor based on the analysis.

7. A method comprising:
receiving first processor input, at a first first-in-first-out (FIFO) memory, from a first processor group that comprises a first processor, wherein the first processor group is configured to execute program code based on the first processor input, the first processor input comprising a set of input signals, a clock signal, and corresponding data utilized for execution of the program code;
storing the first processor input at the first FIFO memory;
outputting the first processor input from the first FIFO memory to a second FIFO memory and to a second processor, wherein the second processor is coupled to the first FIFO memory, wherein the first processor input is output to the second processor according to a first delay;
executing, at the second processor, at least a first portion of the program code responsive to the first processor input;
outputting the first processor input from the second FIFO memory to a third processor coupled to the second FIFO memory, wherein the first processor input is output to the third processor according to a second delay;
executing, at the third processor, at least a second portion of the program code responsive to the first processor input;
simultaneously stopping execution of the first processor, the second processor, and the third processor based on detection of an occurrence of an event related to execution of the program code;
extracting processor system information from one of the second processor and the third processor;
selecting at least one processor to resume execution of at least a portion of the program code based on the processor system information, wherein the at least one processor selected to resume execution includes at least one of the second processor and the third processor;
performing an analysis on the processor system information to determine a state of execution of the program code at at least one of the second processor and the third processor; and
resuming single-step execution of the at least a portion of the program code at the at least one processor selected to resume execution.

8. The method of claim 7, further comprising modifying the processor system information before resuming single-step execution.

9. A system comprising:
a first first-in-first-out (FIFO) memory that is configured to receive a first processor input from a first processor group that comprises a first processor, the first processor input comprising a set of input signals, a clock signal, and corresponding data utilized for execution of program code by the first processor, wherein the first FIFO memory includes logic to store the first processor input and to output the first processor input to a second FIFO memory and to a second processor, wherein the first FIFO memory outputs the first processor input to the second processor according to a first delay;
the second processor coupled to the first FIFO memory, wherein the second processor is configured to execute at least a first portion of the program code responsive to the first processor input;
the second FIFO memory, wherein the second FIFO memory includes logic to output the first processor input to a third processor according to a second delay; and
the third processor coupled to the second FIFO memory, wherein the third processor is configured to execute at least a second portion of the program code responsive to the first processor input;
wherein first information is extracted from at least one of the first processor, the second processor, and the third processor after simultaneously stopping execution of the first processor, the second processor, and the third processor, wherein the first processor, the second processor, and the third processor are simultaneously stopped based on detection of an indicator at at least one of the first FIFO memory and the second FIFO memory, wherein second information is extracted from the at least the one of the first FIFO memory and the second FIFO memory in response to the detection of the indicator, wherein the second information relates to contents of the at least one of the first FIFO memory and the second FIFO memory from which the second information was extracted, and wherein at least one of the first information and the second information is analysed to determine a state of execution of the program code at one of the second processor and the third processor.

10. The system of claim 9, wherein the first delay and the second delay are based on a delay of the clock signal, wherein the first delay and the second delay correspond to a different number of clock cycles.

11. The system of claim 10, wherein the first delay and second delay are each a predetermined number of clock cycles.

12. The system of claim 9, wherein the system functions as a reconfigurable single input multiple data (RC-SIMD) architecture.

13. The system of claim 9, wherein the first processor, the second processor, and the third processor are part of a multi-core processor chip.

14. The system of claim 9, wherein the first FIFO memory and the second FIFO memory are configurable to be disabled, wherein the second processor is disabled for execution of the program code when the first FIFO memory is disabled and wherein the third processor is disabled for execution of the program code when the second FIFO memory is disabled.

15. A removable computer card comprising:
an interface couplable to an expansion slot of a computer system board;
a first first-in-first-out (FIFO) memory that is configured to receive first processor input from a first processor group of the computer system board when the interface is operably connected to the expansion slot, wherein the first processor group comprises a first processor, the first processor input comprising a set of input signals, a clock signal, and corresponding data utilized for execution of program code by the first processor, wherein the first FIFO memory includes logic to store the first processor input and to output the first processor input to a second FIFO memory and to a second processor, wherein the first FIFO memory outputs the first processor input to the second processor according to a first delay associated with the first processor input;

the second processor coupled to the first FIFO memory, wherein the second processor is configured to execute at least a first portion of the program code responsive to the first processor input;

the second FIFO memory, wherein the second FIFO memory includes logic to output the first processor input to a third processor according to a second delay associated with the first processor input; and the third processor coupled to the second FIFO memory, wherein the third processor is configured to execute at least a second portion of the program code responsive to the first processor input;

wherein first information is extracted from at least one of the first processor, the second processor, and the third processor after simultaneously stopping execution of the first processor, the second processor, and the third processor, wherein the first processor, the second processor, and the third processor are simultaneously stopped based on detection of an indicator at at least one of the first FIFO memory and the second FIFO memory, wherein second information is extracted from the at least the one of the first FIFO memory and the second FIFO memory in response to the detection of the indicator, wherein the second information relates to contents of the at least one of the first FIFO memory and the second FIFO memory from which the second information was extracted, and wherein at least one of the first information and the second information is analysed to determine a state of execution of the program code at one of the second processor and the third processor.

16. The removable computer card of claim 15, further comprising a port configured to enable connection to a second computer system.

17. The removable computer card of claim 15, wherein the first FIFO memory is a cache of the second processor, and wherein the second FIFO memory is a cache of the third processor.

18. The removable computer card of claim 15, wherein the first FIFO memory and the second processor are both incorporated in at least one of an application-specific integrated circuit (ASIC) and a field-programmable gate arrays (FPGA).

19. The removable computer card of claim 15, wherein the first FIFO memory and the second processor are both incorporated on a computer chip.

20. The removable computer card of claim 15, wherein the first FIFO memory has at least one port that enables configuration of the first FIFO memory and enables access to contents of the first FIFO memory.

\* \* \* \* \*